United States Patent
Caretta

(10) Patent No.: US 6,899,154 B2
(45) Date of Patent: May 31, 2005

(54) CARCASS STRUCTURE FOR A TIRE AND TIRE PROVIDED WITH THE CARCASS STRUCTURE

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 446 days.

(21) Appl. No.: 10/182,197

(22) PCT Filed: Jan. 22, 2001

(86) PCT No.: PCT/EP01/00643

§ 371 (c)(1),
(2), (4) Date: Jul. 26, 2002

(87) PCT Pub. No.: WO01/54926

PCT Pub. Date: Aug. 2, 2001

(65) Prior Publication Data

US 2003/0051787 A1 Mar. 20, 2003

Related U.S. Application Data

(60) Provisional application No. 60/190,506, filed on Mar. 20, 2000.

(30) Foreign Application Priority Data

Jan. 28, 2000 (EP) ............................................. 00830057

(51) Int. Cl.⁷ .......................... B60C 15/00; B60C 15/06; B60C 9/02
(52) U.S. Cl. ....................... 152/543; 152/539; 152/548; 152/550; 152/558; 152/560
(58) Field of Search ................................ 152/539, 543, 152/548, 550, 558, 560

(56) References Cited

U.S. PATENT DOCUMENTS

| | | | |
|---|---|---|---|
| 4,248,287 A | 2/1981 | Christman | |
| 5,362,243 A | 11/1994 | Huss et al. | |
| 5,362,343 A | 11/1994 | Debroche | |
| 5,660,656 A | 8/1997 | Herbelleauu et al. | |
| 5,702,548 A | 12/1997 | Arnaud et al. | |
| 6,457,504 B1 | 10/2002 | Caretta | |
| 6,814,119 B2 * | 11/2004 | Caretta et al. | 152/539 X |
| 2002/0153081 A1 * | 10/2002 | Caretta | 152/548 |

FOREIGN PATENT DOCUMENTS

| | | |
|---|---|---|
| EP | 0 664 231 | 7/1995 |
| EP | 0 928 680 | 7/1999 |
| EP | 0 928 702 | 7/1999 |
| FR | 384.231 | 4/1908 |
| FR | 1.256.432 | 6/1961 |
| FR | 2 771 050 | 5/1999 |
| WO | WO 99/64225 | 12/1999 |
| WO | WO 00/26014 | 5/2000 |
| WO | WO 00/38906 | 7/2000 |

* cited by examiner

*Primary Examiner*—Adrienne C. Johnstone
(74) *Attorney, Agent, or Firm*—Finnegan, Henderson, Farabow, Garrett & Dunner, L.L.P.

(57) ABSTRACT

A tire carcass structure includes at least one carcass ply and a pair of annular reinforcing structures. The at least one carcass ply includes a first and second series of strip segments. Each strip segment extends around a cross-section profile of the carcass structure to define two lateral portions and an annulus portion. Each annular reinforcing structure includes at least one primary portion and at least one additional portion. The at least one primary portion includes a first circumferentially-inextensible annular insert and a filling body. The at least one additional portion includes at least one second circumferentially-inextensible annular insert. The first annular insert and the at least one second annular insert include one or more elongated elements extending in substantially-concentric turns. A radial extension of the at least one second annular insert is less than a radial extension of the first annular insert.

16 Claims, 5 Drawing Sheets

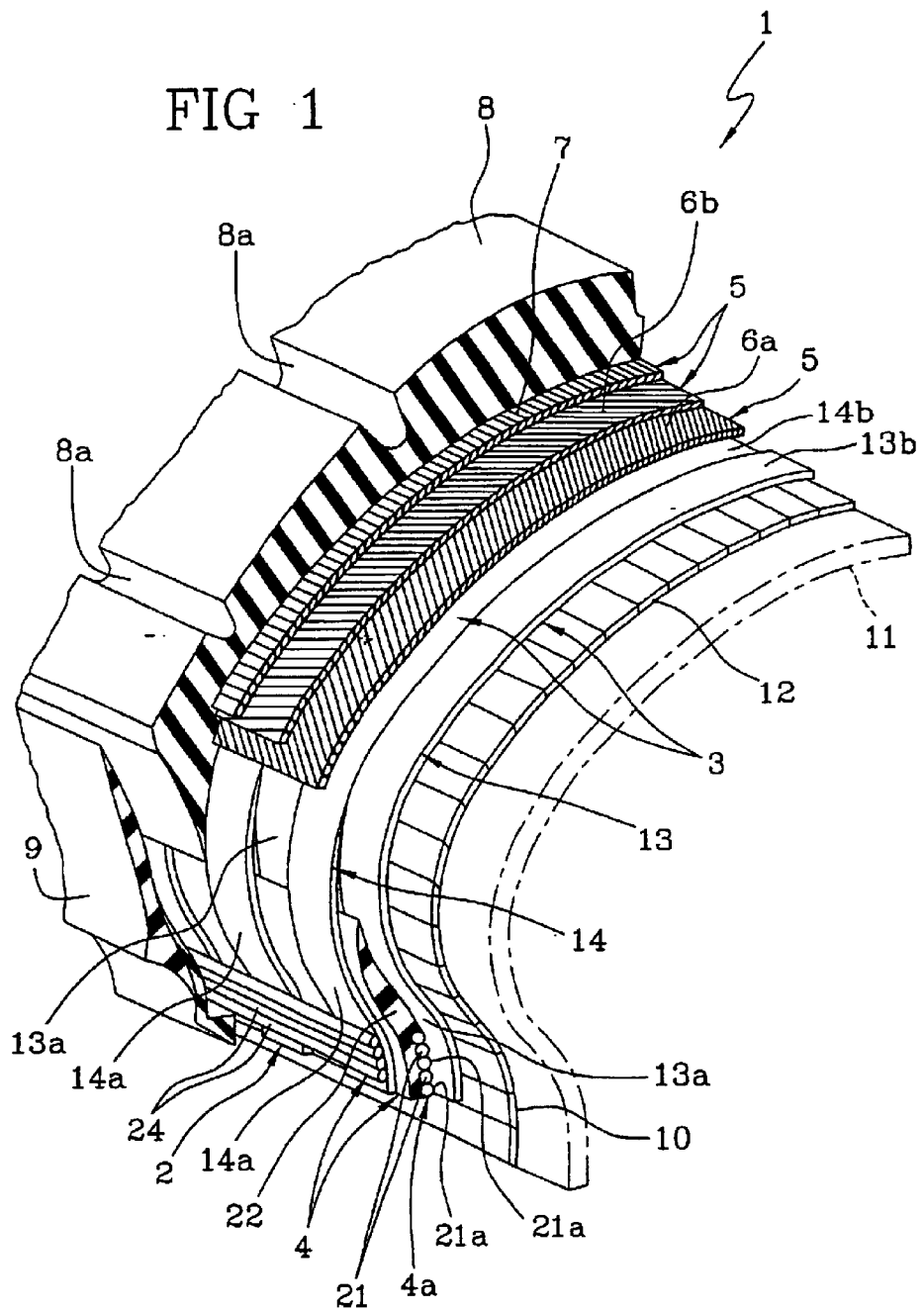

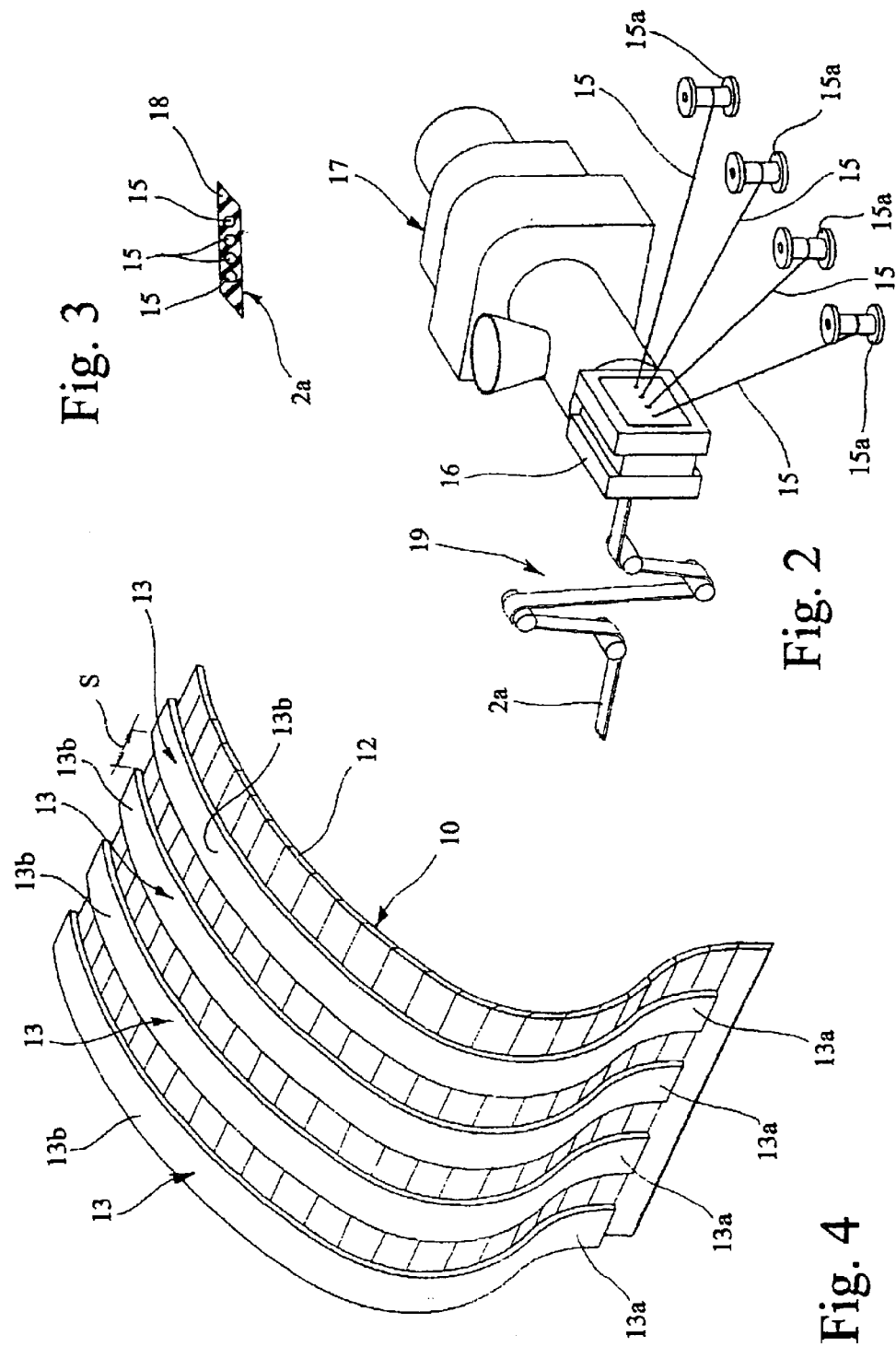

CARCASS STRUCTURE FOR A TIRE AND TIRE PROVIDED WITH THE CARCASS STRUCTURE

CROSS-REFERENCE TO RELATED APPLICATIONS

This application is a national stage entry under 35 U.S.C. §371 from International Application No. PCT/EP01/00643, filed Jan. 22, 2001, in the European Patent Office, the contents of which are relied upon and incorporated herein by reference; further, Applicant claims the benefit under 35 U.S.C. §119(e) based on prior-filed, now abandoned provisional application No. 60/190,506, filed Mar. 20, 2000, in the U.S. Patent and Trademark Office.

BACKGROUND OF THE INVENTION

1. Field of the Invention

The present invention relates to a carcass structure for tyres for vehicle wheels, comprising: at least a carcass ply comprising a first and a second series of strip-like segments circumferentially distributed about a geometric axis of rotation, and comprising each at least two filiform elements arranged longitudinally and mutually parallel and at least partially coated by at least a layer of raw elastomeric material, each of said strip-like segments extending according to a substantially "U" shaped conformation about the cross section profile of the carcass structure, to define two lateral portions mutually distanced in axial direction, and an annulus portion extending in radially external position between the lateral portions; and a pair of annular reinforcing structures each engaged in proximity to a respective interior circumferential edge of the carcass ply.

2. Description of the Related Art

The manufacture of tyres for vehicle wheels entails the formation of a carcass structure essentially composed by one ore more carcass plies shaped according to a substantially toroidal configuration and presenting their axially opposite lateral edges engaged to respective circumferentially inextensible annular reinforcing elements, usually called "bead rings".

On the carcass structure is applied, in circumferentially exterior position, a belt structure comprising one or more belt strips shaped as a closed loop, essentially composed by textile or metallic cords suitably oriented relative to each other and to the cords belonging to the adjacent carcass plies.

In a position circumferentially exterior to the belt structure, a tread band is then applied, normally constituted by a strip of elastomeric material of suitable thickness.

It should be specified that, for the purposes of the present description, the term "elastomeric material" means the rubber compound in its entirety, i.e. the set formed by at least a polymeric base suitably amalgamated with reinforcing fillers and/or process additives of various kinds.

Lastly, on the opposite sides of the tyre being manufactured, a pair of sidewalls is applied, each of which covers a lateral portion of the tyre lying between a so-called shoulder area, located in proximity to the corresponding lateral edge of the tread band, and a so-called bead located in correspondence with the corresponding bead ring.

Traditional manufacturing methods essentially provide for the tyre components listed above to be first produced separately from each other, then assembled in a tyre manufacturing phase.

In the Applicant's perception, such manufacturing methods are still at least partially unsatisfactory in regard to the quality of the finished product and present some critical items with respect to the implementation of the process, which is complex and difficult to control, For instance, the manufacture of the carcass ply or plies to be associated to the bead rings to form the carcass structure requires first that, through an extrusion and/or calendering process, a rubberised fabric be produced comprising continuous textile or metallic cords, arranged longitudinally. This rubberised fabric is subjected to a transverse cutting operation to produce segments of predetermined dimensions, which are subsequently united to originate a continuous belt-like semi-finished product, having transversely positioned parallel cords.

This manufactured item must then be cut into segments of a length correlated to the circumferential development of the carcass to be produced.

Manufacturing methods have also been proposed which, instead of producing semi-finished products, produce the carcass structure directly during the tyre manufacturing phase.

For instance, U.S. Pat. No. 5,362,243 describes a method and an apparatus that form a carcass ply starting from a single cord previously wound on a reel.

According to the method and the apparatus described in this patent, at each operative cycle of the apparatus the cord drawn from the reel by means of motorised driving rollers and kept distended by means of a pneumatic tensioning system is cut to measure to obtain a segment of predefined length.

The cord segment is drawn by a gripping element mounted on a belt wound on motorised pulleys to be laid transversely onto the exterior surface of a toroidal support.

The ends of the segment are then engaged by belt folding organs operating on opposite sides of the toroidal support to apply the cord segment radially onto the toroidal support itself by means of cursor elements which acts in the manner of fingers along the lateral portions of the segment.

The repetition of the operative cycle described above leads to the laying of many cord segments in circumferential side by side relationship until the entire circumferential development of the toroidal support is involved.

Of necessity, the toroidal support is previously coated with a layer of raw rubber which has a dual function of adhering to the cords laid thereon in order adequately to hold them according to a fixed positioning, and of constituting an interior coating, impermeable to air, in the finished tyre Tyres obtained through this manufacturing method present a carcass structure wherein the carcass ply or plies are constituted by single cords each presenting two lateral portions axially distanced from each other and oriented radially to the axis of rotation of the tyre, and an annulus portion extending in radially exterior position between the lateral portions.

Within the scope of the manufacture of the carcass structure, it is also known that in proximity of each of the beads of the tyre, the opposite ends of the single cords constituting a carcass ply are located, with alternating sequence in axially opposite positions relative to an annular anchoring element constituting the aforesaid bead ring, shaped in the manner of an annulus composed by wire turns radially superposed on one another, as can be observed from the Patent EP 0 664 231 and from U.S. Pat. No. 5,702,548. According to the teachings of these documents, a filling body made of elastomeric material is necessarily interposed between the annular anchoring insert and the wires forming the carcass ply or plies.

In Patent FR 384 231, the production is proposed of a carcass structure by the laying, onto a toroidal support, of a series of rectangular bands made of rubberised fabric circumferentially positioned side by side one after the other and arranged according to radial planes relative to the geometric axis of the supporting drum itself. The laying of the bands is conducted in such a way that the terminal edges of two non-consecutive bands are partially covered by the terminal edges of the band interposed between them.

The spaces existing between the terminal edges covered by the bands are filled by means of trapezoidal inserts applied to the terminal edges of the band superposed thereon. The laying of the bands is effected according to several superposed layers, in a number correlated to the thickness to be conferred to the carcass structure. The presence of the aforesaid trapezoidal inserts determines a thickening of the carcass structure in the areas of the beads, providing it with double the thickness measurable in the rim.

U.S. Pat. No. 4,248,287 describes a method according to which the formation of the carcass structures provides for the laying, on a toroidal drum, of a plurality of layers each formed by radial strips composed by rubberised wires and set circumferentially side by side relative to each other. Once the laying is complete, two bead rings are applied in the bead area, around which bead rings are then folded back the terminal edges of the carcass layers formed by the radial strips.

The Applicant has observed that considerable advantages can be achieved both in terms of manufacturing process simplification, and in terms of improvements to the behavioural characteristics of the tyre if the carcass ply or plies are manufactured by adequately laying onto a rigid toroidal support strip-like segments each comprising a plurality of mutually parallel cords incorporated in an elastomeric layer.

In this regard, the Applicant has already developed several manufacturing methods constituting the subject of respective European patent applications.

For instance, documents EP 928680 A and EP 928702 A, the latter being the most relevant prior art, respectively describe a manufacturing method and a tyre wherein the carcass structure is obtained by producing a first and a second carcass ply each obtained by means of strip-like segments sequentially laid in mutual circumferential side-by-side relationship.

The tyres obtained as described in these documents have the terminal portions of the strip-like segments belonging to the first and the second carcass ply positioned at respectively opposite parts relative to the annular bead reinforcement structures.

This feature, combined to the respectively crossed orientation of the strip-like segments belonging to one and to the other ply, provides considerable advantages in terms of structural resistance of the tyre in proximity to the beads and the side walls.

European patent application EP 976535, also in the Applicant's name, proposes the manufacture of a carcass ply by laying a first and a second series of strip-like segments in alternating sequence, with the segments belonging to the first and to the second series terminating at respectively opposite parts relative to the bead reinforcement structures.

It is thus possible to achieve advantages in terms of structural resistance in correspondence with the beads and the sidewalls of the tyre, even in the presence of a single carcass ply.

SUMMARY OF THE INVENTION

According to the present invention, it was observed that by adopting particular expedients in the manufacture of annular structures reinforcing the beads, it is possible to confer desired behavioural characteristics to the tyre and to allow the exploitation of the aforementioned manufacturing concepts recently developed by the Applicant, and all the advantageous aspects connected thereto, also within the scope of the manufacture of motorcycle tyres and the like.

More specifically, the invention relates to a carcass structure for vehicle wheel tyres, characterised in that each of said annular reinforcement structures comprises: at least a primary portion presenting an axially interior side oriented towards terminal edges of the segments belonging to the first series and an axially exterior side oriented towards terminal edges of the segments belonging to the second series; at least an additional portion positioned against the terminal edges of the strip-like segments belonging to the second series, at the opposite side relative to said primary portion; wherein the primary portion of each of said inextensible annular structures comprises: a first circumferentially annular insert shaped substantially in the manner of an annulus positioned coaxially to the carcass structure and adjacently to an interior circumferential edge of the carcass ply, said first annular insert being formed by at least an elongated element extending according to concentric turns; a filling body made of elastomeric material presenting a side joined to the first anchoring annular insert; and wherein said at least one additional portion comprises at least a second circumferentially inextensible annular insert shaped substantially in the manner of a circular crown, formed by at least an elongated element extending according to concentric turns positioned against the terminal edges of the strip-like segments belonging to the second series, said second annular insert presenting a lesser radial extension than the radial extension of the first annular insert.

In particular, the radial extension of the second annular insert preferably measures between ⅓ and ⅔ of the radial extension of the first annular insert.

Advantageously, the strip-like segments belonging respectively to the first series and to the second series are arranged in mutually alternated sequence along the circumferential development of the carcass structure, to form a single carcass ply, the individual strip-like segments belonging respectively to one of said first and second series being arranged according to a circumferential distribution pitch corresponding to a multiple of the width of the strip-like segments themselves.

The annulus portions belonging respectively to the segments of the first and of the second series are advantageously set side by side in mutual alignment along the circumferential development of the carcass structure, whilst the lateral portions of each strip-like segment belonging to the first series are partially covered each by a lateral portion of at least an adjacent strip-like segment belonging to the second series, in a length lying between a radially exterior edge of the primary portion of the annular reinforcing structure and a transition area between said lateral portions and said annulus portions.

It may be advantageously provided for each strip-like segment to present areas with increased width in proximity to the interior circumferential edges of the carcass structure, in correspondence with which the filiform elements comprised in each strip-like segment are mutually removed.

BRIEF DESCRIPTION OF THE DRAWINGS

The invention further relates to a tyre, particularly for two-wheel vehicles, comprising a carcass structure presenting one or more of the innovative technical solutions specified above.

Further features and advantages shall become more readily apparent from the detailed description of a preferred, but not exclusive, embodiment of a carcass structure for tyres, particularly for two-wheel vehicles, according to the present invention. The description shall made below with reference to the accompanying drawings, provided purely by way of non limiting indication, in which:

FIG. 1 is an interrupted and cut out view of a tyre provided with a carcass structure manufactured in accordance with the present invention;

FIG. 2 is a diagram showing the manufacture of a continuous strip-like element destined to form the carcass ply or plies of the tyre;

FIG. 3 shows, in cross section view, an embodiment of the aforesaid strip-like element;

FIG. 4 shows an interrupted perspective view of a schematic representation of the laying sequence of a first series of strip-like segments in order to form a carcass ply of the tyre according to the invention;

DETAILED DESCRIPTION OF THE PREFERRED EMBODIMENTS

Figure 5:
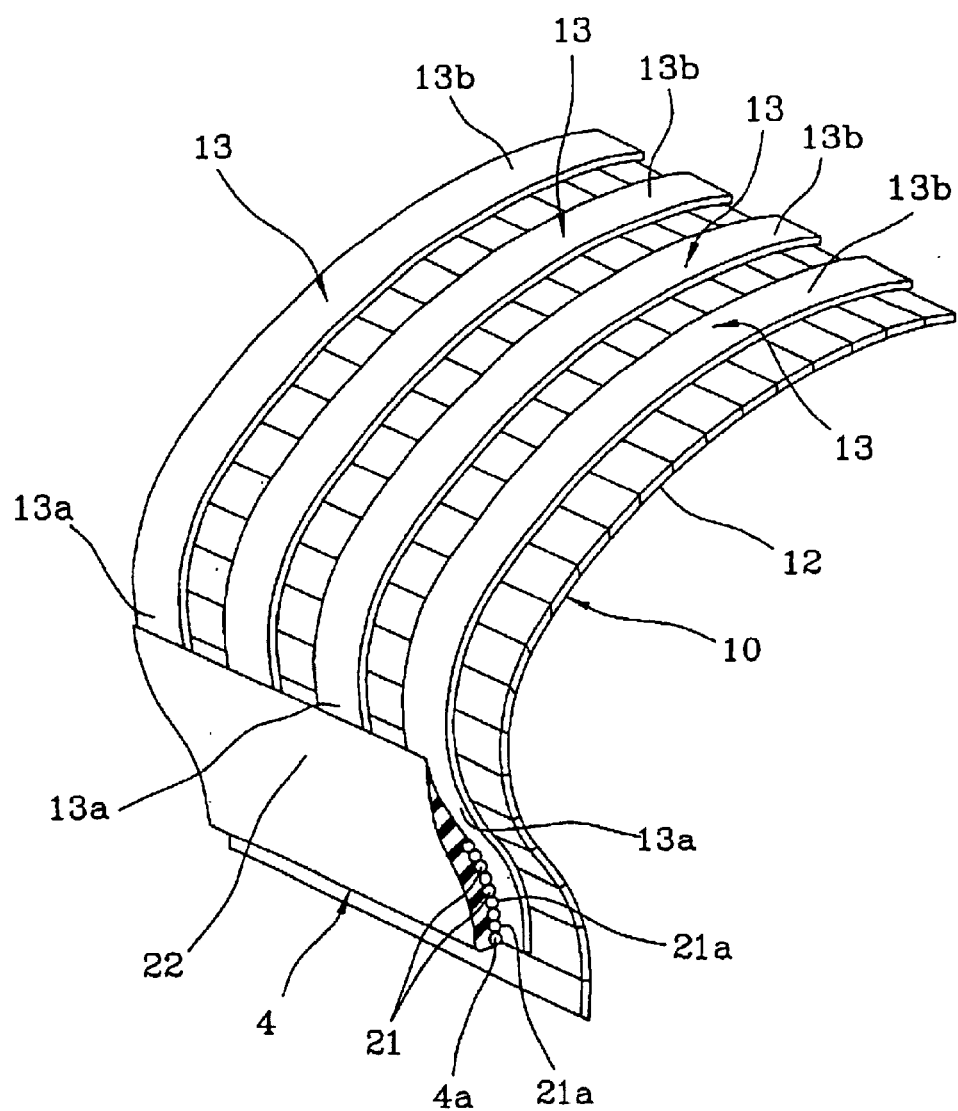
FIG. 5 shows an interrupted perspective view of a primary portion of an annular reinforcing structure applied laterally on terminal edges of the strip-like segments belonging to the first series.

With reference to the aforementioned figures, the number 1 globally indicates a tyre, particularly for two-wheel vehicles, having a carcass structure 2 manufactured in accordance with the present invention.

The carcass structure 2 has at least a carcass ply 3 shaped according to a substantially toroidal configuration and engaged by means of its opposite circumferential edges, to a pair of annular reinforcing structures 4 (whereof only one is shown in the drawings) each of which, once the tyre has been completed, is located in the area usually identified with the name of "bead".

On the carcass structure 2 is applied, in circumferentially exterior position, a belt structure 5 comprising at least a primary belt strip 7, formed by one or more continuous cords wound according to turns set axially side by side and substantially parallel to the direction of circumferential development of the tyre, as well as possible auxiliary belt strips 6a, 6b situated in a radially interior position relative to the primary belt strip 7. To the belt structure 5 is circumferentially superposed a tread band 8 whereon, following a moulding operation performed simultaneously with the curing of the tyre, longitudinal and/or transverse recesses 8a are obtained, arranged to define a desired "tread design".

The tyre further comprises a pair of so-called "sidewalls" applied laterally at opposite sides onto the carcass structure 2.

The carcass structure 2 can be coated on its inner walls by a sealing layer 10 or so-called "liner", essentially constituting a layer of elastomeric material impermeable to air able to guarantee the hermetic tightness of the inflated tyre.

The assembly of the components listed above, as well as the manufacture of one or more thereof, takes place with the aid of a toroidal support 11, schematically visible in FIG. 1, shaped according to the configuration of the inner walls of the tyre to be manufactured.

The toroidal support 11 can have smaller dimensions than the finished tyre, according to a linear measurement preferably ranging between 2% and 5%, taken, by way of indication, along the circumferential development of the support itself in correspondence with its equatorial plane X—X, which coincides with the equatorial plane of the tyre itself.

The toroidal support 11, neither described nor illustrated in detail because it is not particularly relevant for the purposes of the invention, can for instance be constituted by a collapsible drum or by an inflatable tube suitably reinforced to assume and maintain the desired toroidal shape in the inflated condition.

All this having been stated, the manufacture of the tyre 1 entails first the formation of the carcass structure 2, which starts with the possible formation of the sealing layer 10.

This sealing layer 10 can advantageously be obtained by circumferentially winding about the toroidal support 11 at least a ribbon-like band 12 made of elastomeric material impermeable to air, produced by a strainer and/or by a calender situated in the vicinity of the toroidal support itself. As can be observed from FIG. 1, the winding of the ribbon-like band 12 takes place substantially according to circumferential turns consecutively set by side to follow the cross section profile of the outer surface of the toroidal support 11.

For the purposes of the present invention the term cross section profile means the configuration presented by the semi-section of the toroidal support 11 sectioned according to a plane radial to its own geometric axis of rotation, not shown in the drawings, coinciding with the geometric axis of rotation of the tyre and, hence, of the carcass structure 2 being manufactured.

The carcass ply 3 is formed directly on the toroidal support 11 by laying, as shall become clearer farther on, a first and a second series of strip-like segments 13, 14, obtained from at least a continuous strip-like element 2a preferably presenting a width ranging between 3 mm and 15 mm.

As FIG. 2 shows, the preparation of the continuous strip-like element 2a essentially provides for one or more filiform elements 15, and preferably three to ten filiform elements 15, fed by respective reels 15a, to be guided through a strainer 16 associated to an extrusion apparatus 17 which feeds raw elastomeric material through the strainer itself.

It is specified that, for the purposes of the present description, the term "strainer" means the part of the extrusion apparatus identified in the art also with the term "extrusion head", provided with a so-called "die" traversed by the product being processed in correspondence with an exit port shaped and dimensioned according to the geometric and dimensional characteristics to be given to the product itself.

The elastomeric material and the filiform elements 15 are intimately united inside the strainer 16, generating at the output thereof the continuous strip-like element 2a, formed by at least a layer of elastomeric material 18 in whose thickness are incorporated the filiform elements themselves.

Depending on requirements, it is possible to guide the filiform elements 15 into the strainer in such a way that they are not integrally incorporated into the layer of elastomeric material 18 by emerge from one or both its surfaces.

The filiform elements 15 can, for instance, be constituted each by a textile cord with a diameter preferably ranging between 0.6 mm and 1.2 mm, or by a metal cord, with a diameter preferably ranging between 0.3 mm and 2.1 mm.

Advantageously, if required, the filiform elements 15 can be positioned in the continuous strip-like element 2a in such a way as to provide unexpected characteristics of compactness and homogeneity to the carcass ply 3 thereby obtained.

For this purpose, the filiform elements 15 can, for instance, be arranged according to a density exceeding six filiform elements per centimeter, measured circumferentially on the carcass ply 3 in proximity to the equatorial plane of the tyre 1. It is in any case preferably provided for the filiform elements 15 to be positioned in the strip-like element 2a according to a distance between their respective centres no smaller than 1.5 times the diameter of the filiform elements themselves, in order to allow for adequate rubberising between adjacent wires.

The continuous strip-like element 2a exiting the strainer 16 can advantageously be guided, possibly through an accumulating-compensating device 19, onto a laying apparatus whose structural and operating characteristics are described more in detail in document EP 928 680 A, in the name of the same Applicant, whose content is considered enclosed herein.

This laying apparatus is able sequentially to cut the continuous strip-like element 2a to obtain strip-like segments 13, 14 of predetermined length.

The execution of the cutting of each strip-like segment 13, 14 is immediately followed by the laying of the segment onto the toroidal support 11, shaping the strip-like segment according to a "U" configuration around the cross section profile of the toroidal support itself, in such a way that in the strip-like segment 13, 14 can be identified two lateral portions 13a, 14a radially developing towards the axis of the toroidal support 11, in positions that are axially distanced from each other, and a portion of annulus 13b, 14b extending in radially exterior position between the lateral portions themselves.

The stickiness of the raw elastomeric material forming the layer 18 which coats the filiform elements 15 assures the stable adhesion of the strip-like segments 13, 14 on the surfaces of the toroidal support 11, also in the absence of the sealing layer 10 on the toroidal support itself. More in particular, the adhesion described above is manifested as soon as the strip-like segment 13, 14 comes in contact with the toroidal support 11 in a radially exterior area of its cross section profile.

In addition or instead of the exploitation of the natural stickiness of the elastomeric material, as described above, the holding of one or more of the strip-like segments 13, 14 on the toroidal support 11 can be obtained by means of an aspirating action produced through one or more suitable holes provided on the toroidal support itself.

The toroidal support 11 can be actuated in angular rotation according to a stepped motion in synchrony with the actuation of the aforesaid laying apparatus, in such a way that each cutting action on each strip-like segment 13, 14 is followed by its laying in a circumferentially distanced position relative to the previously laid segment 13, 14.

More specifically, the rotation of the toroidal support 11 takes place according to an angular pitch whereto corresponds a circumferential displacement equal to a multiple of, and more precisely to double, the width of each strip-like segment 13, 14.

It should be noted that, for the purposes of the present description, unless otherwise indicated, the term "circumferential" refers to a circumference lying in the equatorial plane and in proximity to the exterior surface of the toroidal support 11.

The operative sequence described above is such that a first complete revolution of the toroidal support 11 about its own axis determines the laying of the first series of strip-like segments 13, circumferentially distributed according to a circumferential step equal to twice the width of each of them. Therefore, as FIG. 4 clearly shows, between one and the other of the segments belonging to the first series an empty space "S" is left which, at least in correspondence with the annulus portions 13b of the segments themselves, equals the latter in width.

Depending on requirements, the laying of the strip-like segments 13 belonging to the first series can take place according to planes radial to the axis of rotation of the toroidal support 11, or offset in parallel fashion relative to said radial plane, as described in patent application WO 00/38906 in the name of the Applicant.

Moreover, this laying operation can be performed according to an inclined orientation relative to the direction of circumferential development of the toroidal support 11, for instance according to an angle ranging between 3 and 15 degrees.

The adjustment of the laying angle of the strip-like segments can, for instance, be obtained by suitably orienting the geometric axis of rotation of the drum relative to the laying apparatus.

The manufacture of a carcass ply 2 then proceeds with the phase of applying the aforementioned annular reinforcing structures 4, and more specifically primary portions 4a thereof, in proximity to each of the interior circumferential edges of the carcass ply 3 being manufactured, in order to obtain the carcass areas, known as "beads", especially destined to guarantee the anchoring of the tyre to a corresponding mounting rim.

Each of the aforesaid annular reinforcing structures 4 preferably comprises a first annular anchoring insert 21 substantially inextensible in the circumferential sense, substantially shaped in the manner of an annulus concentric to the geometric axis of rotation of the toroidal support 11 and situated in a circumferentially interior position against terminal edges presenting strip-like segments 13 belonging to the first series.

The first annular anchoring insert 21 is composed by at least a metallic elongated element wound according to multiple, substantially concentric turns 21a. The turns 21a can be defined by a continuous spiral or by concentric rings formed by respective elongated elements.

To the annular anchoring insert 21 is combined a filling body 22 made of elastomeric material, preferably thermoplastic, having hardness ranging between 48° and 55° Shore D, measured at a temperature of 23° C. and preferably presenting a radial extension exceeding the radial extension of the annular anchoring insert 21.

Preferably, the filling body 22 is situated in an axially external position against the first annular anchoring insert 21, and it extends radially, tapering away from the annular insert itself.

In accordance with a preferential embodiment, the annular anchoring element 21 is manufactured directly against the terminal edges of the strip-like segments 13, forming the turns 21 by winding the elongated element with the possible aid of rollers or other convenient devices acting in contrast with the surface of the toroidal support 11.

The stickiness of the elastomeric layer 18 that coats the strip-like segments 13 belonging to the first series, as well as the possible sealing layer 10 previously laid on the drum itself, assure the stable positioning of the individual turns 21a being formed.

The laying of the elongated element can also be advantageously preceded by a rubberising phase wherein the elongated elements itself is coated with at least a layer of raw elastomeric material which, in addition to guaranteeing an optimal rubber-metal attachment on the elongated element itself, further favours adhesion.

Subsequently, the filling body 22 can in turn be formed directly in contact with the annular anchoring insert 21, for instance applying a continuous strip made of elastomeric material exiting a strainer positioned adjacently to the drum 11. The continuous strip can present the final section shape of the filling body 22, already as it exits the respective strainer. Alternatively, the continuous strip will present a smaller cross section than that of the filling body, and the latter shall be obtained applying the strip itself according to multiple turns set side by side and/or superpose, to define the filling body 22 in its final configuration.

After the application of the primary portions 4a belonging to the respective annular reinforcing structures 4, the formation of the carcass ply 3 is completed by laying the second series of strip-like segments 14 obtained by cutting to measure the continuous strip-like element 2a and applied on the toroidal support 11 in a manner similar to the one described for the strip-like segments 13 belonging to the first series.

Figure 6:
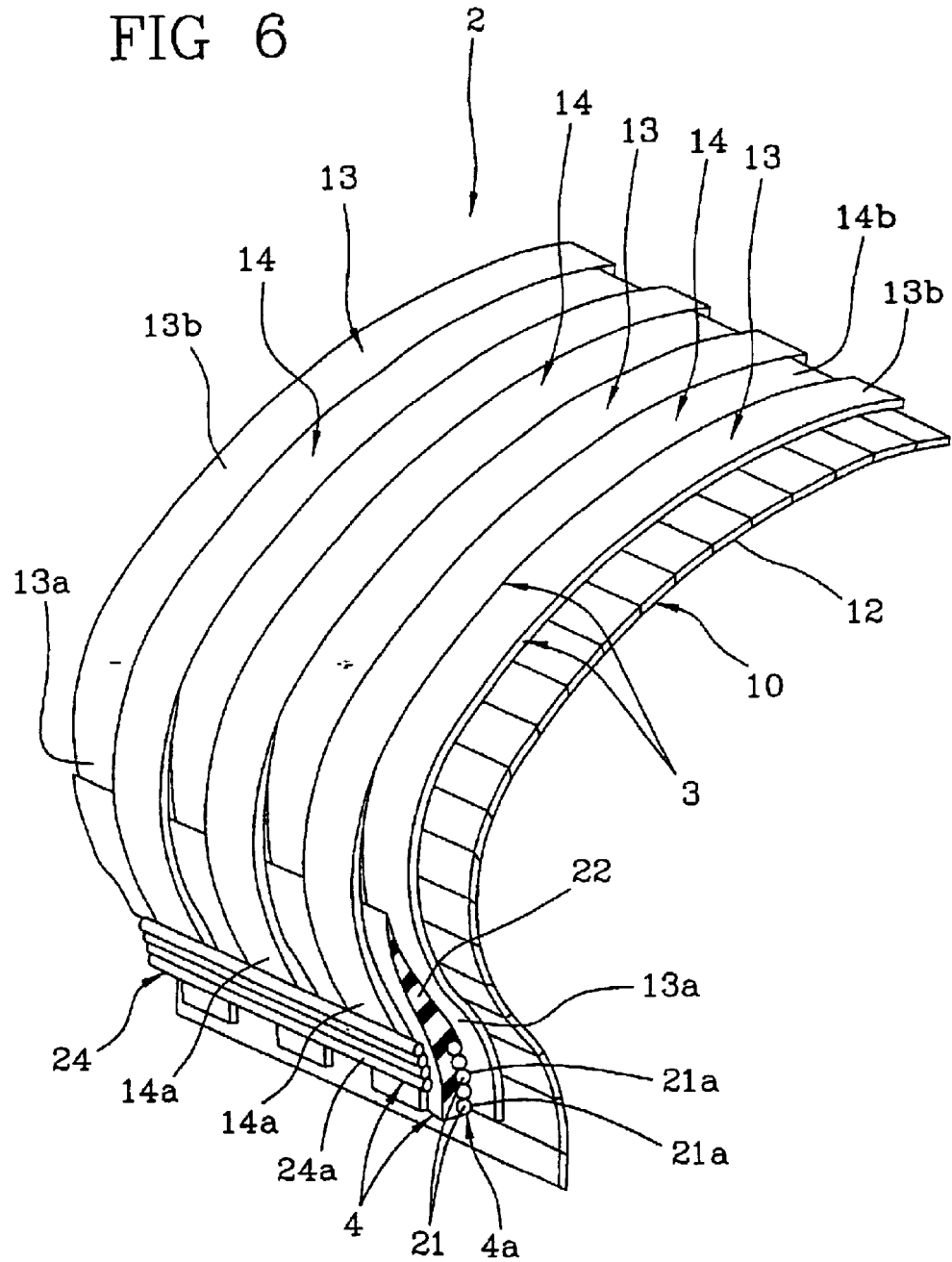
FIG. 6 shows an interrupted perspective view of a schematic representation of the laying sequence of a second series of strip-like segments with respective terminal edges superposed to the primary portion of the annular reinforcing structure.
Figure 7:
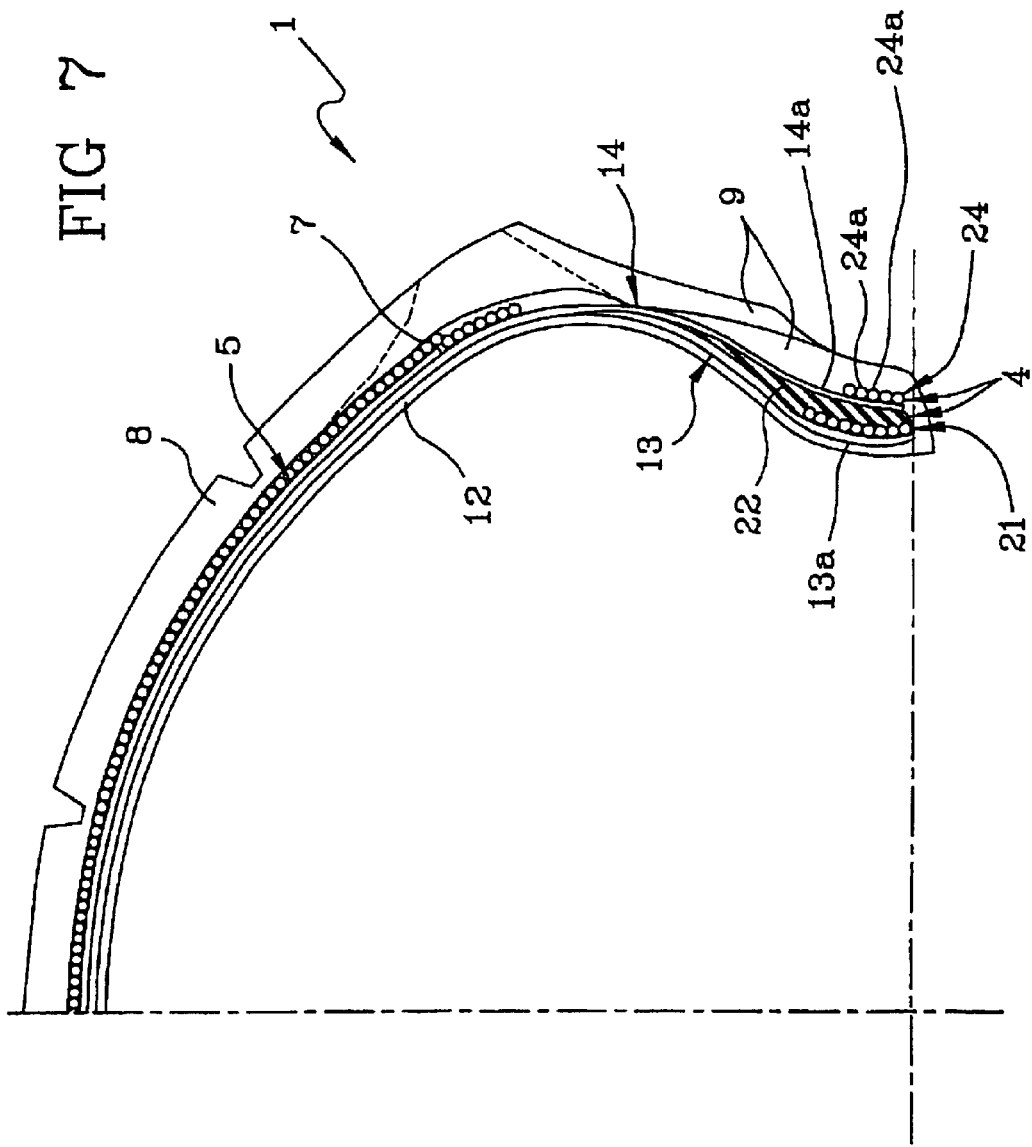
FIG. 7 is a cross semi-section of a tyre for motorcycle vehicles provided with a carcass structure according to the present invention.

As FIG. 6 clearly shows, each segment 14 belonging to the second series is laid according to a "U" configuration around the cross section profile of the toroidal support 11, between two consecutive segments 13 belonging to the first series and oriented parallel thereto. More specifically each segment 14 belonging to the second series presents the respective annulus portion 14b circumferentially interposed between the annulus portions 13a of the segments 13 belonging to the first series, to fill the space "S" existing between them, and a pair of lateral portions 14a which bring the terminal edges of the segment itself in superposition to the primary portions 4a of the respective annular reinforcement structures 4, in axially opposite positions relative to the terminal edges of the segments 13 belonging to the first series.

In other words, each primary portion 4a, having a section profile that tapers away from the axis of the tyre, presents an axially interior side oriented towards the terminal edges of the strip-like segments 13 belonging to the first series, and an axially exterior side oriented towards the terminal edges of the segments 14 belonging to the second series.

The lateral portions 14a of each segment 14 belonging to the second series can also partially cover the lateral portions 13a of two consecutive segments 13 belonging to the first series, each in a length lying between the radially exterior edge of the primary portion 4a belonging to the respective annular reinforcing structure 4 and the transition area between the lateral portion itself and the annulus portion 13b, 14b.

Due to the mutual convergence between the contiguous lateral portions 13a, 14a, oriented radially to the geometric axis of the toroidal support 11, the superposition or covering of the lateral portions 13a of the segments 13 belonging to the first series, i.e. the circumferential amplitude of the superposition areas. Progressively diminishes starting from a maximum value in proximity to the radially exterior edge of the primary portion 4a of each annular reinforcing structure 4, down to a value of zero in correspondence with the transition area between the lateral portions 13a, 14a and the annulus portions 13b, 14b.

If, in proximity to the beads, a more homogeneous distribution of the filiform elements 15 respectively composing the segments 13, 14 of the first and of the second series is to be obtained, a deflection step can be executed sequentially on the continuous strip-like element 2a in the areas of its longitudinal development corresponding to the extremities of the strip-like segments 13, 14 to be obtained following the cutting actions. In this way, on the development of each strip-like segment 13, 14, areas with increased width are defined, positioned in correspondence with the interior circumferential edges of the carcass ply 3 thus formed.

The deflection action causes a reduction in the thickness of the elastomeric layer 18 and an increase in the width of the strip-like element 2a with the consequent mutual separation of the filiform elements 15. In so doing, the terminal edges of each segment 13, 14 can be widened until they present, in correspondence with the circumferentially interior extremities, a width that may even be double that of the annulus portions 13b, 14b, and in any case such as to coat completely the respective interior and exterior sides of each primary portion 4a.

After laying the strip-like segments 14 belonging to the second series in the manner described above, the formation of the annular bead reinforcing structures 4 is completed For this purpose, as FIG. 6 shows, for each of the reinforcing structures 4 a second annular insert 24 is formed, shaped in the manner of an annulus, obtained for instance by winding a second elongated element according to concentric turns 24a, in a manner similar to the one described with reference to the formation of the first annular insert 21.

The second insert 24 thus constitutes and additional portion of the reinforcing structure 4, which is formed and/or applied against the terminal edges 14a of the strip-like segments 14 belonging to the second series. For this purpose, the second elongated element can be wound directly against the carcass ply 3 previously formed on the toroidal support 11, to form the second annular insert 24 directly in contact on the carcass ply itself.

Following this operation, each of the terminal edges 14a of the segments 14 belonging to the second series is advantageously enclosed between the primary portion 4a and the additional portion 24 of the respective annular reinforcing structure 4.

Advantageously, the second annular insert 24 presents a lesser radial extension than that of the first annular insert 21, and preferably ranging between $\frac{1}{3}$ and $\frac{2}{3}$ thereof.

In radial tyres, a belt structure 5 is usually applied to the carcass structure 2.

This belt structure 5 can be obtained in any manner convenient to the person versed in the art and essentially comprises a primary belt strip 7, for instance obtained by winding at least a continuous cord according to turns set axially side by side on the carcass ply 3. Together with the aforesaid primary strip 7, additional reinforcing layers can also be provided, advantageously constituted by fabric and/or felted strips, i.e. layers of compound charged with short reinforcing fibres, for instance of the aramidic type.

In the illustrated embodiment the belt structure further comprises a first and a second auxiliary belt strips 6a, 6b presenting cords with respectively crossed orientation, situated in a position that is radially interior to the primary strip 7.

On the belt structure 5 are then applied to tread band 8 and the sidewalls 9, also obtainable in any manner found convenient by the person versed in the art.

The tyre 1 thus manufactured can now be subjected, if need be after its removal from the support 11, to a curing phase which can be conducted in any known and conventional manner.

The present invention achieves important advantages.

The subject carcass structure can be obtained directly on a toroidal support whereon, advantageously, the entire tyre can be formed, with considerable reduction in processing times compared to the method described in document U.S. Pat. No. 5,362,343.

The constructive and structural conception of the subject tyre, especially with reference to its carcass structure 2, allows to achieve considerable improvements in terms of structural resistance, especially in proximity to the sidewalls and beads, where greater strength is normally required, as well as road behaviour, benefiting in the meantime from all the advantages typically connected to a single-ply carcass structure.

In particular, the constructive features of the inextensible annular structures 4 and the manner whereby they are integrated in the carcass ply 3 are such as to give an excellent structural resistance to the tyre 1, while adequately containing its thickness in correspondence with the beads, in accordance with the requirements typically found in motor-cycle tyres.

The presence of the circumferentially inextensible annular inserts 21, 24 whose turns 21a, 24a are intimately joined to the carcass ply 3 and oriented substantially perpendicular relative to the filiform elements 15 belonging to the different series of strip-like segments 13, 14, provides an excellent coupling with the filiform elements themselves. The carcass structure 2 is thereby considerably strengthened in the areas corresponding to the beads of the tyre 1 without requiring, for this purpose, the use of additional strip-like inserts, usually called "flippers", wound in a loop around the annular reinforcing structures 4, used instead in the prior art.

What is claimed is:

1. A carcass structure for a tyre, comprising:
   at least one carcass ply; and
   a pair of annular reinforcing structures;
   wherein the at least one carcass ply comprises:
      a first series of strip segments; and
      a second series of strip segments;
   wherein the first and second series of strip segments are circumferentially distributed about a rotation axis of the carcass structure,
   wherein each strip segment comprises at least two filiform elements positioned longitudinally and parallel to each other,
   wherein the at least two filiform elements are at least partially coated by one or more layers of a first elastomeric material,
   wherein each strip segment extends according to a substantially U-shaped conformation around a cross-section profile of the carcass structure to define two lateral portions, mutually distanced in an axial direction of the carcass structure, and an annulus portion extending in a radially-outer position between the lateral portions, and
   wherein each annular reinforcing structure is adjacent to a respective inner circumferential edge of the at least one carcass ply,
   wherein each annular reinforcing structure comprises:
      at least one primary portion, comprising an axially-inner side oriented toward terminal edges of the first series of strip segments, and an axially-outer side oriented toward terminal edges of the second series of strip segments; and
      at least one additional portion adjacent to the terminal edges of the second series of strip segments on an opposite side relative to the at least one primary portion;
   wherein the at least one primary portion comprises:
      a first circumferentially-inextensible annular insert; and
      a filling body;
   wherein the first annular insert is substantially annulus-shaped,
   wherein the first annular insert is adjacent to an inner edge of the at least one carcass ply,
   wherein the first annular insert comprises one or more elongated elements extending in substantially-concentric turns,
   wherein the filling body comprises the first elastomeric material or a second elastomeric material, and
   wherein at least one side of the filling body is adjacent to the first annular insert,
   wherein the at least one additional portion comprises:
      at least one second circumferentially-inextensible annular insert;
   wherein the at least one second annular insert is substantially annulus-shaped,
   wherein the at least one second annular insert comprises one or more elongated elements extending in substantially-concentric turns,
   wherein the at least one second annular insert is adjacent to the terminal edges of the second series of strip segments, and
   wherein a radial extension of the at least one second annular insert is less than a radial extension of the first annular insert.

2. The carcass structure of claim 1, wherein a ratio of the radial extension of the at least one second annular insert to the radial extension of the first annular insert is greater than or equal to $1/3$ and less than or equal to $2/3$.

3. The carcass structure of claim 1, wherein the strip segments of the first and second series are arranged in mutually-alternating sequence along a circumferential development of the carcass structure to form a single carcass ply.

4. The carcass structure of claim 3, wherein the strip segments of the first series are arranged according to a circumferential distribution pitch corresponding to a multiple of a width of the strip segments of the first series, or
   wherein the strip segments of the second series are arranged according to a circumferential distribution pitch corresponding to a multiple of a width of the strip segments of the second series, or
   wherein the strip segments of the first series are arranged according to a circumferential distribution pitch corresponding to a multiple of the width of the strip segments of the first series and the strip segments of the second series are arranged according to a circumferential distribution pitch corresponding to a multiple of the width of the strip segments of the second series.

5. The carcass structure of claim 3, wherein the annulus portions of the strip segments of the first and second series are mutually aligned side-by-side along the circumferential development of the carcass structure.

6. The carcass structure of claim 5, wherein the lateral portions of the strip segments of the first series are each partially covered by a lateral portion of at least one adjacent strip segment of the second series over at least part of a length lying between a radially-outer edge of the at least one primary portion of the respective annular reinforcing structure and a transition area between the lateral portion and a corresponding annulus portion.

7. The carcass structure of claim 1, wherein each strip segment comprises areas of increased width near the inner circumferential edges of the at least one carcass ply.

8. The carcass structure of claim 7, wherein, for each strip segment, a distance between the at least two filiform elements in the areas of increased width is greater than a corresponding distance between the at least two filiform elements not in the areas of increased width.

9. A tyre, comprising:
a carcass structure;
wherein the carcass structure comprises:
at least one carcass ply; and
a pair of annular reinforcing structures;
wherein the at least one carcass ply comprises:
a first series of strip segments; and
a second series of strip segments;
wherein the first and second series of strip segments are circumferentially distributed about a rotation axis of the carcass structure,
wherein each strip segment comprises at least two filiform elements positioned longitudinally and parallel to each other,
wherein the at least two filiform elements are at least partially coated by one or more layers of a first elastomeric material,
wherein each strip segment extends according to a substantially U-shaped conformation around a cross-section profile of the carcass structure to define two lateral portions, mutually distanced in an axial direction of the carcass structure, and an annulus portion extending in a radially-outer position between the lateral portions, and
wherein each annular reinforcing structure is adjacent to a respective inner circumferential edge of the at least one carcass ply,
wherein each annular reinforcing structure comprises:
at least one primary portion, comprising an axially-inner side oriented toward terminal edges of the first series of strip segments, and an axially-outer side oriented toward terminal edges of the second series of strip segments; and
at least one additional portion adjacent to the terminal edges of the second series of strip segments on an opposite side relative to the at least one primary portion;
wherein the at least one primary portion comprises:
a first circumferentially-inextensible annular insert; and
a filling body;
wherein the first annular insert is substantially annulus-shaped,
wherein the first annular insert is adjacent to an inner edge of the at least one carcass ply,
wherein the first annular insert comprises one or more elongated elements extending in substantially-concentric turns,
wherein the filling body comprises the first elastomeric material or a second elastomeric material, and
wherein at least one side of the filling body is adjacent to the first annular insert,
wherein the at least one additional portion comprises:
at least one second circumferentially-inextensible annular insert;
wherein the at least one second annular insert is substantially annulus-shaped,
wherein the at least one second annular insert comprises one or more elongated elements extending in substantially-concentric turns,
wherein the at least one second annular insert is adjacent to the terminal edges of the second series of strip segments, and
wherein a radial extension of the at least one second annular insert is less than a radial extension of the first annular insert.

10. The tyre of clam 9, wherein a ratio of the radial extension of the at least one second annular insert to the radial extension of the first annular insert is greater than or equal to ⅓ and less than or equal to ⅔.

11. The tyre of claim 9, wherein the strip segments of the first and second series are arranged in mutually-alternating sequence along a circumferential development of the carcass structure to form a single carcass ply.

12. The tyre of claim 11, wherein the strip segments of the first series are arranged according to a circumferential distribution pitch corresponding to a multiple of a width of the strip segments of the first series, or
wherein the strip segments of the second series are arranged according to a circumferential distribution pitch corresponding to a multiple of a width of the strip segments of the second series, or
wherein the strip segments of the first series are arranged according to a circumferential distribution pitch corresponding to a multiple of the width of the strip segments of the first series and the strip segments of the second series are arranged according to a circumferential distribution pitch corresponding to a multiple of the width of the strip segments of the second series.

13. The tyre of claim 11, wherein the annulus portions of the strip segments of the first and second series are mutually aligned side-by-side along the circumferential development of the carcass structure.

14. The tyre of claim 13, wherein the lateral portions of the strip segments of the first series are each partially covered by a lateral portion of at least one adjacent strip segment of the second series over at least part of a length lying between a radially-outer edge of the at least one primary portion of the respective annular reinforcing structure and a transition area between the lateral portion and a corresponding annulus portion.

15. The tyre of claim 9, wherein each strip segment comprises areas of increased width near the inner circumferential edges of the at least one carcass ply.

16. The tyre of claim 15, wherein, for each strip segment, a distance between the at least two filiform elements in the areas of increased width is greater than a corresponding distance between the at least two filiform elements not in the areas of increased width.

* * * * *